US012449760B2

(12) United States Patent
Arata

(10) Patent No.: US 12,449,760 B2
(45) Date of Patent: Oct. 21, 2025

(54) IMAGE FORMING APPARATUS HAVING A PROCESS UNIT WITH A LOCK MECHANISM

(71) Applicant: KYOCERA Document Solutions Inc., Osaka (JP)

(72) Inventor: Tatsuro Arata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/734,504

(22) Filed: Jun. 5, 2024

(65) Prior Publication Data

US 2024/0411268 A1 Dec. 12, 2024

(30) Foreign Application Priority Data

Jun. 9, 2023 (JP) ................................ 2023-095450

(51) Int. Cl.
*G03G 21/00* (2006.01)
*G03G 21/18* (2006.01)

(52) U.S. Cl.
CPC ................................ *G03G 21/185* (2013.01)

(58) Field of Classification Search
USPC ........................................................ 399/111
See application file for complete search history.

(56) References Cited

U.S. PATENT DOCUMENTS 9,599,952 B2 * 3/2017 Fujinaka ............ G03G 21/1633
2003/0059230 A1 * 3/2003 Yokoi ................ G03G 21/1633 399/111
2006/0115293 A1 * 6/2006 Seo .................... G03G 21/1623 399/110
2010/0080618 A1 * 4/2010 Suzuki ............... G03G 21/1853 399/111
2010/0260514 A1 * 10/2010 Suzuki ............... G03G 15/0194 399/111
2021/0088964 A1 3/2021 Udagawa

FOREIGN PATENT DOCUMENTS

JP 2021-047324 A 3/2021

* cited by examiner

*Primary Examiner* — Quana Grainger
(74) *Attorney, Agent, or Firm* — Stein IP, LLC

(57) ABSTRACT

A process unit includes a unit frame detachable from a main body frame, a plurality of development cartridges mounted so as to be mutually independently attachable and detachable with respect to the unit frame, and a lock mechanism. The lock mechanism has a lock member that restrains movement of the unit frame by being held at a first position at which the lock member is engageable with the main body frame. The lock member is caused, by all the development cartridges being detached from the unit frame, to shift from the first position to a second position at which the lock member does not engage with the main body frame.

3 Claims, 13 Drawing Sheets

IMAGE FORMING APPARATUS HAVING A PROCESS UNIT WITH A LOCK MECHANISM

INCORPORATION BY REFERENCE

This application is based on and claims the benefit of priority from Japanese Patent Application No. 2023-095450 filed on Jun. 9, 2023, the contents of which are hereby incorporated by reference.

BACKGROUND

The present disclosure relates to an image forming apparatus.

Conventional image forming apparatuses are provided with a process unit attachable and detachable with respect to an apparatus main body. The process unit includes components such as a development cartridge for developing a toner image.

SUMMARY

According to one aspect of the present disclosure, an image forming apparatus includes a main body frame and a process unit. The process unit executes a development process of developing an electrostatic image into a toner image. The process unit has a unit frame, a plurality of development cartridges, and a lock mechanism. The unit frame is mounted in the main body frame so as to be attachable and detachable with respect to the main body frame by being pulled toward one side in a first direction. The plurality of development cartridges are mounted in the unit frame so as to be mutually independently attachable and detachable with respect to the unit frame, and each contain toner for the development process. The lock mechanism restrains detachment of the unit frame from the main body frame. The lock mechanism has a lock member that restrains movement of the unit frame toward the one side in the first direction by being held at a first position at which the lock member is engageable with the main body frame. The lock member is caused, by all the development cartridges being detached from the unit frame, to shift from the first position to a second position at which the lock member does not engage with the main body frame.

DETAILED DESCRIPTION

Hereinafter, with reference to FIGS. 1 to 13, an image forming apparatus 100 of an embodiment will be described. A tandem-type color laser printer is dealt with as an example in the following description, but the present disclosure is applicable also to a multifunction peripheral having functions including a copier function and the like.

In the following description, a direction perpendicular to a flat floor surface on which the image forming apparatus 100 is installed is referred to as an up-down direction. Further, of horizontal directions orthogonal to the up-down direction, one direction is denoted with a sign D1 and referred to as a first direction D1, and the other direction orthogonal to the one direction is denoted with a sign D2 and referred to as a second direction D2. Note that the term "horizontal" herein encompasses not only being completely horizontal but also being substantially horizontal.

For example, the first direction D1 is a front-back direction (a depth direction) of the image forming apparatus 100. One side in the first direction D1 is a front side, and the other side opposite to the one side in the first direction D1 is a back side. Further, the second direction D2 is a left-right direction (a width direction) of the image forming apparatus 100. One side in the second direction D2 is a left side, and the other side opposite to the one side in the second direction D2 is a right side.

<Overall Structure of Image Forming Apparatus>

Figure 1:
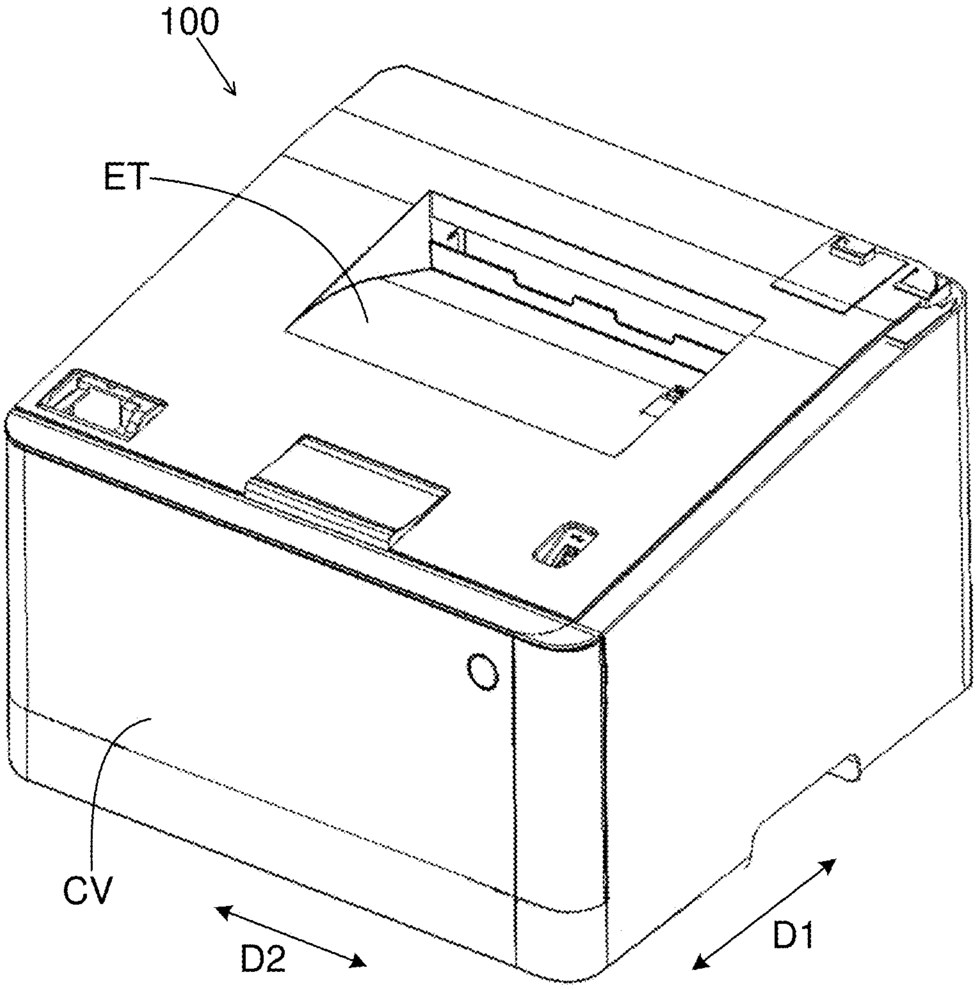
FIG. 1 is a perspective view of an image forming apparatus according to an embodiment.
Figure 2:
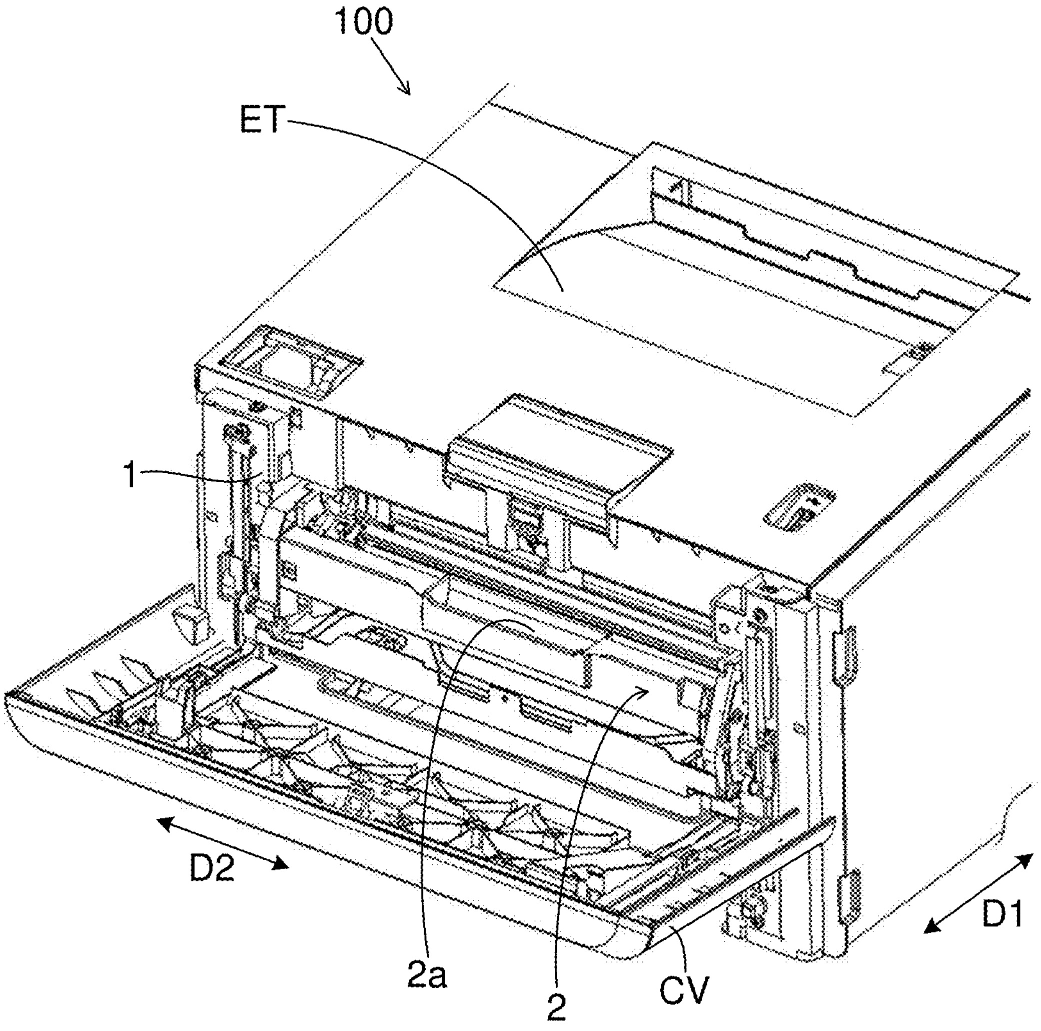
FIG. 2 is a perspective view of the image forming apparatus illustrated in FIG. 1, with a front cover open.

The image forming apparatus 100 of the present embodiment has an exterior as illustrated in FIGS. 1 and 2. The image forming apparatus 100 is provided with a main body frame 1. Further, the image forming apparatus 100 is provided with a front cover CV. The main body frame 1 is covered by exterior covers including the front cover CV (signs for the other covers are omitted). The main body frame 1 supports the exterior covers. The front cover CV is disposed on the one side in the first direction D1. The front cover CV covers an internal area of the image forming apparatus 100 from the one side in the first direction D1.

The main body frame 1 supports the front cover CV so as to be rotatable about an axis extending in the second direction D2. The front cover CV rotates, with its lower end part as a pivot, so as to swing its upper end part. In other words, the front cover CV is supported so as to be openable and closable with respect to the main body frame 1. By the front cover CV being opened, the internal area of the image forming apparatus 100 is caused to be exposed to the one side in the first direction D1 (see FIG. 2). By the front cover CV being closed, the internal area of the image forming apparatus 100 is caused to be covered from the one side in the first direction D1 (see FIG. 1).

Figure 3:
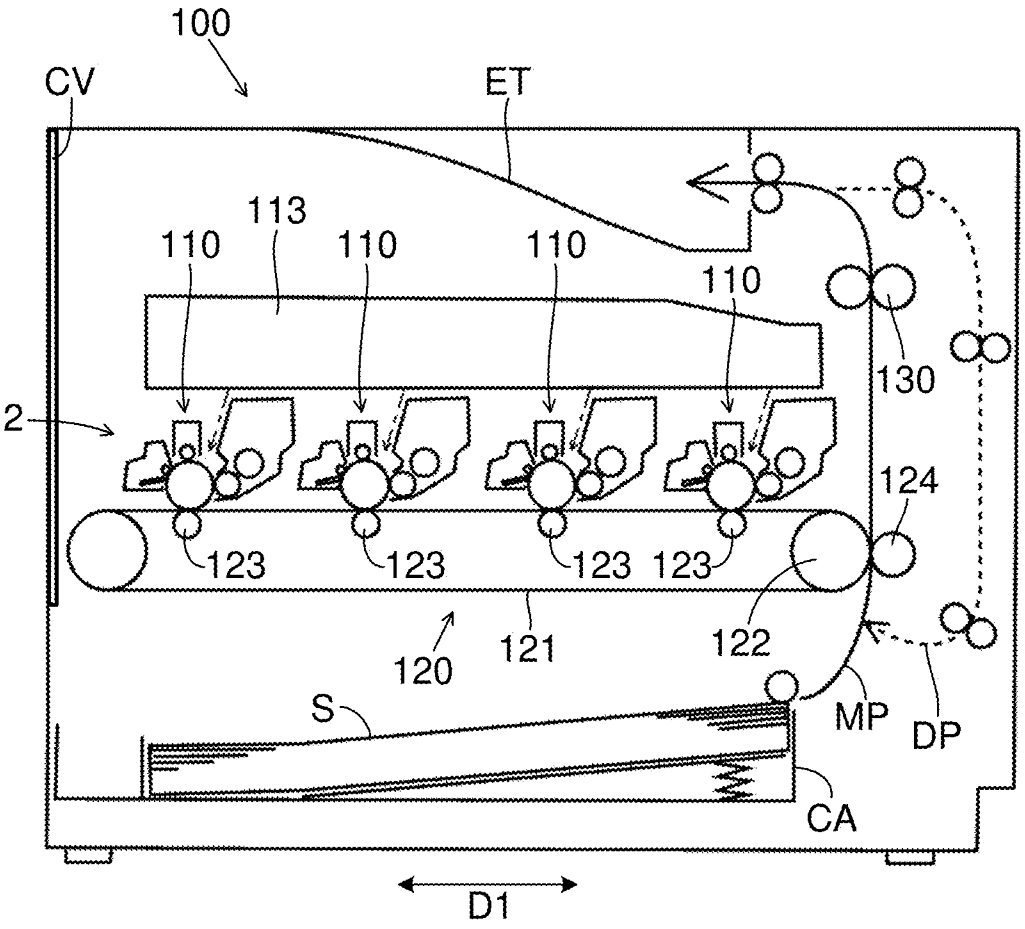
FIG. 3 is a schematic diagram illustrating an internal structure of the image forming apparatus according to the embodiment.

As shown in FIG. 3, the image forming apparatus 100 is provided with a main conveyance path MP. In FIG. 3, the main conveyance path MP is schematically illustrated with a solid line arrow. A duplex-printing conveyance path DP, which will be described later, is schematically illustrated with a dashed line.

Further, the image forming apparatus 100 is provided with a sheet cassette CA. The sheet cassette CA stores sheets S to be used in a printing job. There is no particular limitation on a type of the sheets S.

In a printing job, the image forming apparatus 100 feeds a sheet S stored in the sheet cassette CA into the main conveyance path MP, and conveys the sheet S along the main conveyance path MP. Then, the image forming apparatus 100 prints an image on the sheet S that is being conveyed. In other words, the image forming apparatus 100 transfers a toner image onto the sheet S that is being conveyed.

Note that the sheet cassette CA is mounted in a lower part of a main body of the image forming apparatus 100. The sheet cassette CA is attachable and detachable with respect to the main body (in other words, the main body frame 1) of the image forming apparatus 100. By pulling out the sheet cassette CA from the apparatus main body toward the one side in the first direction D1, it is possible to detach the sheet cassette CA from the apparatus main body.

The image forming apparatus 100 includes four image forming portions 110 corresponding to four different colors of cyan, magenta, yellow, and black. The image forming portions 110 each form a toner image of a corresponding color. Hereinafter, with a focus on one of the image forming portions 110, a structure thereof will be described. The image forming portions 110 are basically identical in structure. Thus, as to descriptions of the structures of the other image forming portions 110, the following description will also be applied, and their descriptions will be omitted.

Figure 4:
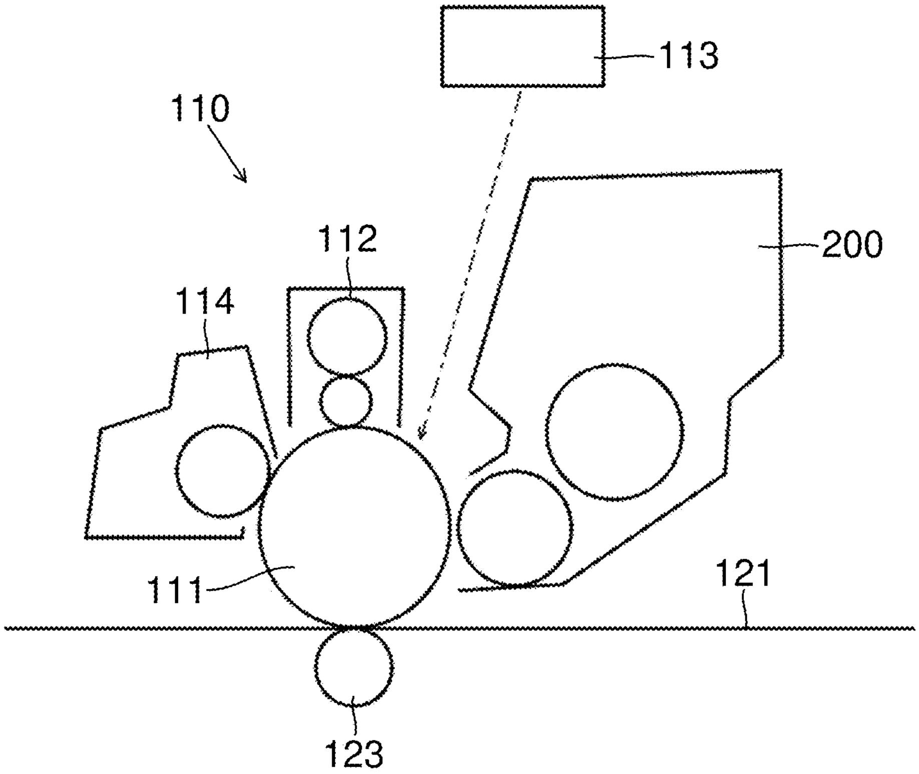
FIG. 4 is a schematic diagram illustrating an image forming portion of the image forming apparatus according to the embodiment.

The image forming portion 110 is, as illustrated in FIG. 4, provided with a development cartridge 200. The development cartridge 200 stores toner of a corresponding color, and uses the toner to execute a developing process. Further, the image forming portion 110 is provided with a photosensitive drum 111 and a charging device 112. Note that the image forming apparatus 100 is provided with one exposure unit 113 with respect to all the image forming portions 110 for the four different colors. Further, the image forming portion 110 includes a cleaning device 114.

During image formation executed by the image forming portion 110, the photosensitive drum 111 rotates. The charging device 112 charges an outer circumferential surface of the photosensitive drum 111. The exposure unit 113 exposes the outer circumferential surface of the photosensitive drum 111 with light, thereby forming an electrostatic latent image on the outer circumferential surface of the photosensitive drum 111. Then, the development cartridge 200 executes, as the development process, a process of supplying the toner onto the outer circumferential surface of the photosensitive drum 111 and developing the electrostatic latent image into a toner image. Note that the toner image on the outer circumferential surface of the photosensitive drum 111 is primarily transferred onto an intermediate transfer belt 121, which will be described later. The cleaning device 114 removes toner remaining on the surface of the photosensitive drum 1 without being transferred onto the intermediate transfer belt 121.

Referring back to FIG. 3, the image forming apparatus 100 is provided with an intermediate transfer unit 120. The intermediate transfer unit 120 is disposed below the four image forming portions 110. The intermediate transfer unit 120 is provided with the intermediate transfer belt 121. The intermediate transfer belt 121 is an endless belt.

The intermediate transfer belt 121 is stretched, and rotatably supported, by a plurality of rollers including a driving roller 122 (reference signs for the other rollers are omitted). The intermediate transfer belt 121 is in contact with the outer circumferential surface of the photosensitive drum 111, and rotates in that state. The driving roller 122 is caused to rotate by a driving force transferred thereto from a belt motor (unillustrated). The intermediate transfer belt 121 rotates, when the driving roller 122 rotates, by following the rotation of the driving roller 122.

The intermediate transfer unit 120 is provided with primary transfer rollers 123. The primary transfer rollers 123 are assigned one to each of the four different colors of cyan, magenta, yellow, and black. The primary transfer rollers 123 are disposed on an inner side of the intermediate transfer belt 121. Each of the primary transfer rollers 123 is disposed facing the photosensitive drum 111 of the corresponding color across the intermediate transfer belt 121.

The intermediate transfer unit 120 is provided with a secondary transfer roller 124. The secondary transfer roller 124 is pressed against an outer circumferential surface of the intermediate transfer belt 121, thereby forming a transfer nip between itself and the intermediate transfer belt 121. The main conveyance path MP extends via the transfer nip.

The image forming portions 110 form toner images of corresponding colors. The primary transfer rollers 123 primarily transfer the toner images onto the outer circumferential surface of the intermediate transfer belt 121. The intermediate transfer belt 121 rotates carrying the toner images primarily transferred thereto from the photosensitive drums 111 on the outer circumferential surface thereof. While passing through the transfer nip, a sheet S makes contact with the outer circumferential surface of the intermediate transfer belt 121. The secondary transfer roller 124 forms a transfer electric field between itself and the intermediate transfer belt 121 to thereby secondarily transfer the toner images onto the sheet S passing through the transfer nip.

The image forming apparatus 100 is provided with a pair of fixing rollers 130. The pair of fixing rollers 130 include a heating roller and a pressure roller. The heating roller incorporates a heater. The pressure roller is pressed against the heating roller, forming a fixing nip between itself and the heating roller, and the pair of fixing rollers 130 rotate while nipping therebetween the sheet S conveyed from the transfer nip. That is, the pair of fixing rollers 130 apply heat and pressure to the sheet S passing through the fixing nip. Thereby, the pair of fixing rollers 130 fix, on the sheet S, the toner images having been transferred onto the sheet S. Thereafter, the sheet S is ejected onto an ejection tray ET.

The image forming apparatus 100 is capable of executing, as the printing job, in addition to simplex printing of printing a toner image only on one side of the sheet S, duplex printing of printing a toner image on each side of the sheet S. In order to execute a duplex printing job, the image forming apparatus 100 is provided with the duplex-printing conveyance path DP.

The duplex-printing conveyance path DP branches off from the main conveyance path MP at a position, in the main conveyance path MP, downstream of the fixing nip in a sheet conveyance direction. Then, the duplex-printing conveyance path DP rejoins the main conveyance path MP at a position, in the main conveyance path MP, upstream of the transfer nip in the sheet conveyance direction.

When the job to be executed is a simplex printing job, the sheet S passes through the transfer nip only once, so that transfer processing is performed once with respect to the sheet S passing through the transfer nip. Then, after the transfer processing is performed once, the sheet S is ejected as it is onto the ejection tray ET.

When the job to be executed is a duplex printing job, transfer processing is performed once with respect to each of front and back sides of the sheet S, so that the sheet S passes through the transfer nip twice. Specifically, when the sheet S passes through the transfer nip for the first time, transfer processing is performed with respect to one side of the sheet S. After the first transfer processing, at a timing after a rear end of the sheet S has passed through the fixing nip but before the sheet is completely ejected onto the ejection tray ET, the sheet S is switched back. Thereby, the sheet S is drawn into the duplex-printing conveyance path DP from the rear end of the sheet S.

Thereafter, the sheet S is conveyed along the duplex-printing conveyance path DP. Then, the sheet S is conveyed, from a position upstream of the transfer nip in the sheet conveyance direction, back into the main conveyance path MP. The sheet S, which has been conveyed back into the main conveyance path MP, passes through the transfer nip again. At this time, front and back sides of the sheet S are reversed compared to during the previous passing through the transfer nip. Thereby, when the sheet S passes through the transfer nip for a second time, transfer processing is performed with respect to the other side of the sheet S, which is a side opposite to the one side.

<Structure of Process Unit>

The image forming apparatus 100 is provided with a process unit 2 that executes the development process of developing an electrostatic latent image into a toner image. Specifically, the image forming portions 110 for the four different colors (that is, a plurality of image forming portions 110) are unitized into the process unit 2. In other words, the process unit 2 at least includes development cartridges 200 for the four different colors (that is, a plurality of development cartridges 200).

Figure 5:
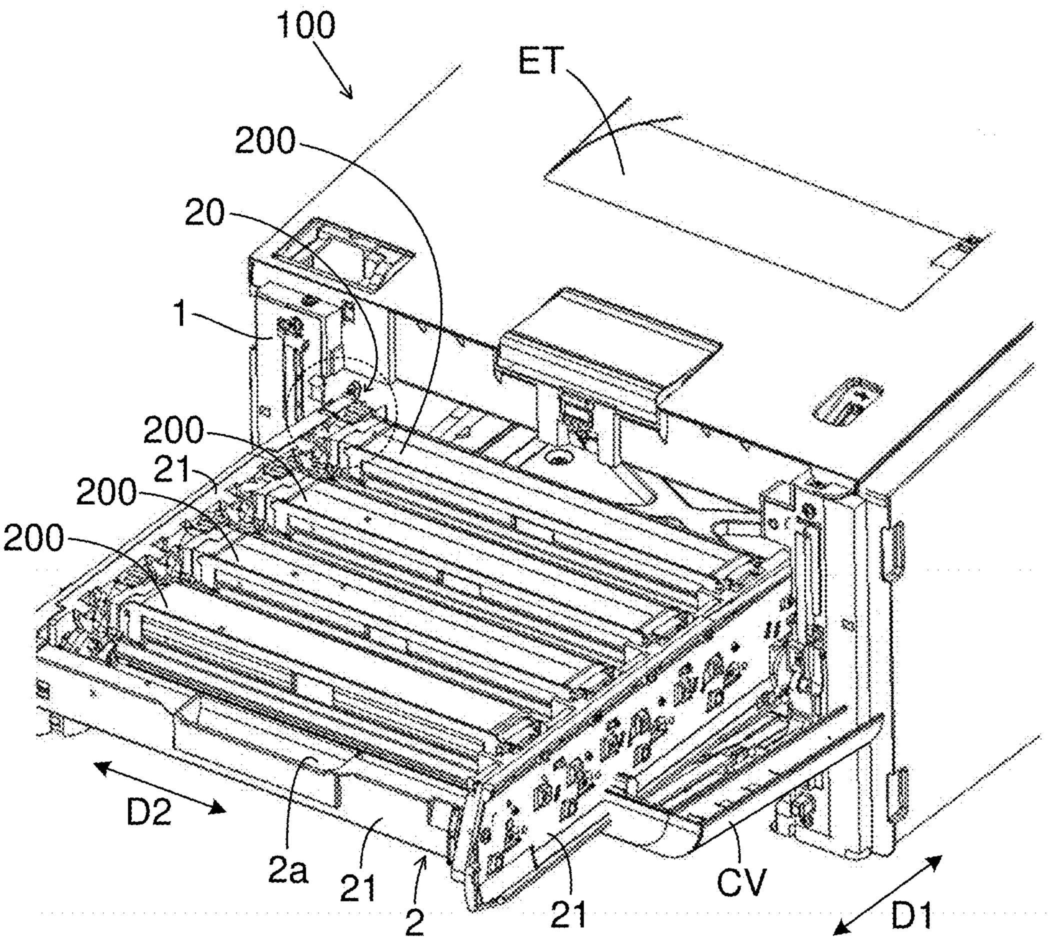
FIG. 5 is a perspective view of the image forming apparatus illustrated in FIG. 1, with a process unit pulled out.

The process unit 2 has a unit frame 21 (see FIG. 5). In the unit frame 21, the image forming portions 110 for the four different colors are disposed. That is, in the unit frame 21, the development cartridges 200 for the four different colors are disposed. By being disposed in the unit frame 21, the image forming portions 110 for the four different colors are unitized.

The image forming portions 110 for the four different colors are arranged in the first direction D1. That is, the development cartridges 200 for the four different colors are arranged in the first direction D1. Here, the unit frame 21 at least has a pair of side plates (for which reference signs are omitted) that sandwich the image forming portions 110 for the four different colors in the second direction D2. The pair of side plates of the unit frame 21 rotatably support the rotary bodies included in the image forming portions 110 for the four different colors.

The unit frame 21 is mounted in the main body frame 1 so as to be attachable and detachable with respect to the main body frame 1 in a horizontal direction (specifically, the first direction D1). Thereby, the process unit 2 is horizontally attachable and detachable with respect to the apparatus main body (that is, the main body frame 1) of the image forming apparatus 100. For maintenance of the image forming apparatus 100, the process unit 2 is detached from the apparatus main body. For example, to replace any of the development cartridges 200, the process unit 2 is detached from the apparatus main body.

In detachment operation of detaching the process unit 2, first, with the process unit 2 mounted in the main body of the image forming apparatus 100 (that is, with the unit frame 21 mounted in the main body frame 1), the front cover CV is opened. By the front cover CV being opened, the state illustrated in FIG. 2 is obtained. That is, the process unit 2 is exposed to the one side in the first direction D1. Then, from this state, the unit frame 21 is pulled out toward the one side in the first direction D1.

For example, the unit frame 21 has a grip portion **2*a* that is gripped by an operator who is in charge of detaching the process unit 2. A state obtained after the process unit 2 is pulled out with respect to the main body frame 1 to the one side in the first direction D1 is illustrated in FIG. 5**.

When the process unit 2 is pulled out with respect to the main body frame 1, the development cartridges 200 for the four different colors are exposed. The development cartridges 200 for the four different colors are mounted so as to be mutually independently attachable and detachable with respect to the unit frame 21. With this structure, when one of the development cartridges 200 is detached from the unit frame 21, the other development cartridges 200 stay mounted in the unit frame 21. That is, to detach all the development cartridges 200 for the four different colors from the unit frame 21, the detachment operation needs to be performed with respect to each of the development cartridges 200 for the four different colors. In the image forming portion 110, components other than the development cartridge 200, such as the photosensitive drum 111, are mounted in a manner fixed with respect to the unit frame 21, and thus cannot be detached from the unit frame 21.

Note that the development cartridges 200 for the four different colors are attachable and detachable with respect to the unit frame 21 in the up-down direction. To be detached from the unit frame 21, the development cartridges 200 for the four different colors are each pulled up with respect to the unit frame 21. For this reason, the unit frame 21 does not cover, from above, the development cartridges 200 for the four different colors.

When a pull-out amount by which the process unit 2 is pulled out with respect to the main body frame 1 reaches a predetermined amount, in other words, immediately before the process unit 2 is detached from the main body frame 1, movement of the process unit 2 toward the one side in the first direction D1 (herein simply referred to as pull-out movement) is locked so that the process unit 2 is prevented from being pulled further out. After the pull-out amount of the process unit 2 with respect to the main body frame 1 has reached the predetermined value, in order to further pull out the process unit 2 to detach it from the main body frame 1, it is necessary to release the lock on the pull-out movement. Note that the state where the pull-out movement is locked is a state where the process unit 2 cannot be detached from the main body frame 1 and thus corresponds to a state where the process unit 2 is mounted in the main body frame 1.

<Structure of Lock Mechanism>

Figure 6:
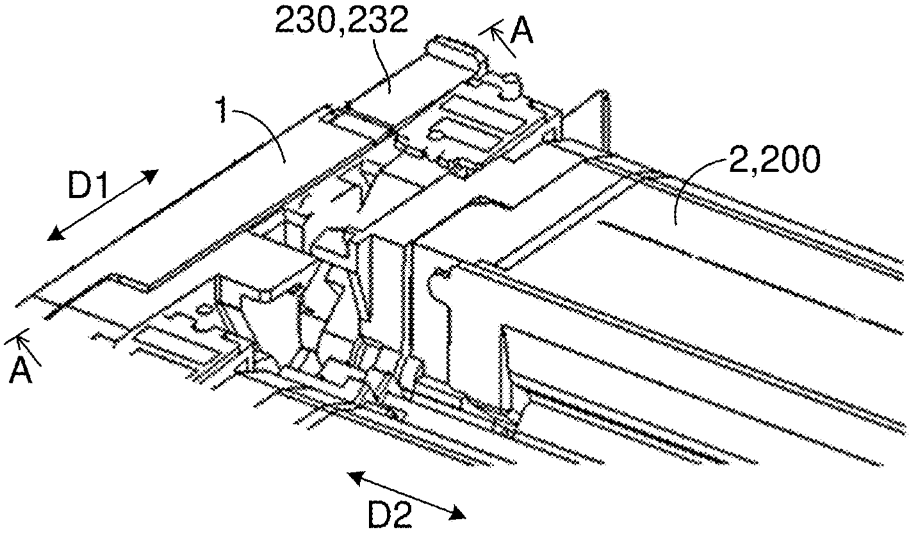
FIG. 6 is an enlarged view of an area encircled by a dotted line in FIG. 5.
Figure 7:
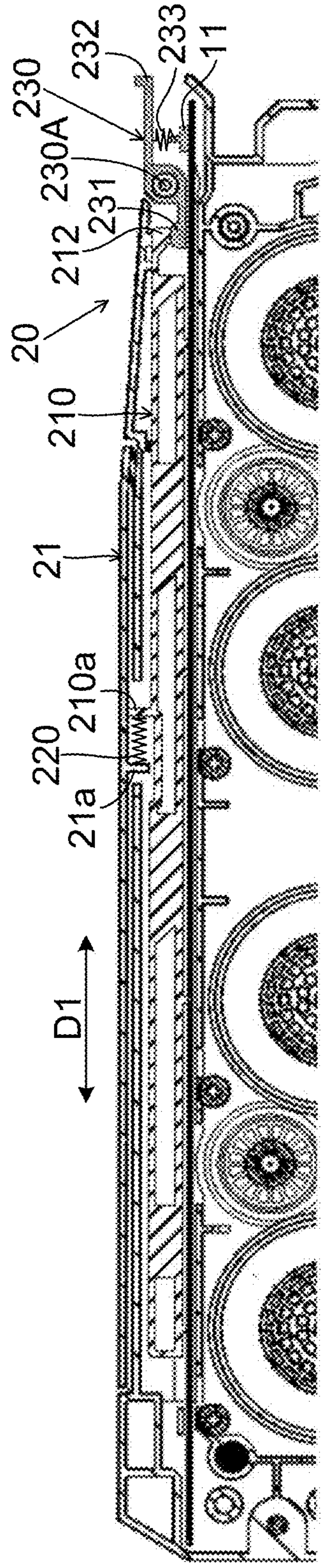
FIG. 7 is a diagram corresponding to a section taken along line AA' in FIG. 6.

The process unit 2 has a lock mechanism 20 as illustrated in FIGS. 5 to 10. The lock mechanism 20 is a mechanism that restrains detachment of the process unit 2 (that is, detachment of the unit frame 21) from the main body frame 1. The lock mechanism 20 is disposed on one of the pair of side plates of the unit frame 21 that is located on the one side in the second direction D2, and the lock mechanism 20 is not disposed on the side plate located on the other side in the second direction D2. Note that FIG. 6 is an enlarged view of an area encircled by a dotted line in FIG. 5. FIG. 7 is a diagram corresponding to a section taken along line AA' in FIG. 6.

The lock mechanism 20 at least has a link member 210, a first biasing member 220, and a lock member 230. It can be said that a main body engagement portion 10 (see FIG. 13), which will be described later, is also one component of the lock mechanism 20.

Figure 8:
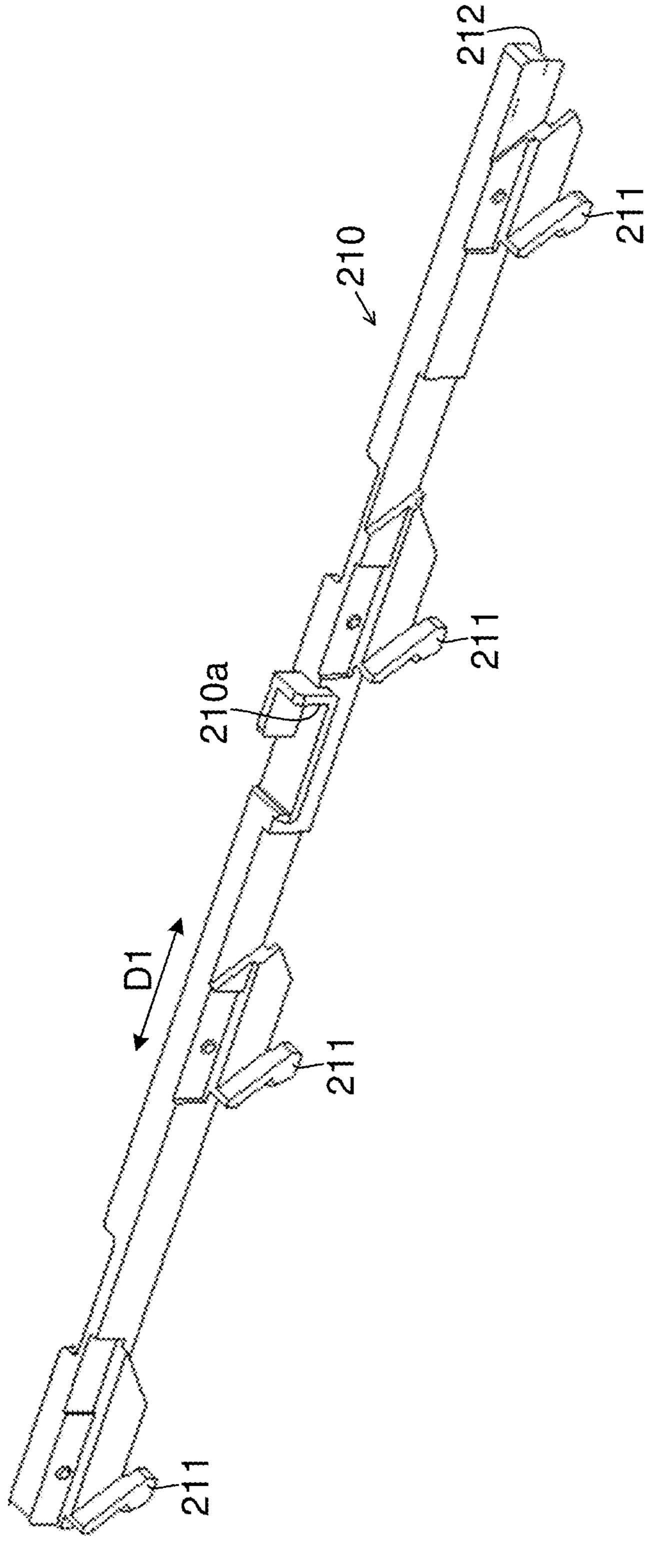
FIG. 8 is a perspective view of a link member of the image forming apparatus according to the embodiment.

As illustrated in FIGS. 7 and 8, the link member 210 is supported so as to be reciprocatable in the first direction D1 with respect to the unit frame 21 (specifically, the side plate on the one side in the second direction D2). The link member 210 shifts its position in the first direction D1 in accordance with attachment and detachment of the development cartridges 200 for the four different colors with respect to the unit frame 21.

Specifically, the link member 210 has four link engagement portions 211 in an integral manner. The four link engagement portions 211 are disposed so as to be spaced from each other in the first direction D1. The four link engagement portions 211 are each assigned to a different one of the development cartridges 200.

The development cartridges 200 for the four different colors each have one of cartridge engagement portions 201 (see FIG. 9) that engages with the link engagement portion 211 assigned thereto. The cartridge engagement portions 201 each project in a cylindrical shape toward the one side in the second direction D2. The cartridge engagement portions 201 are boss portions projecting toward the one side in the second direction D2.

Figure 9:
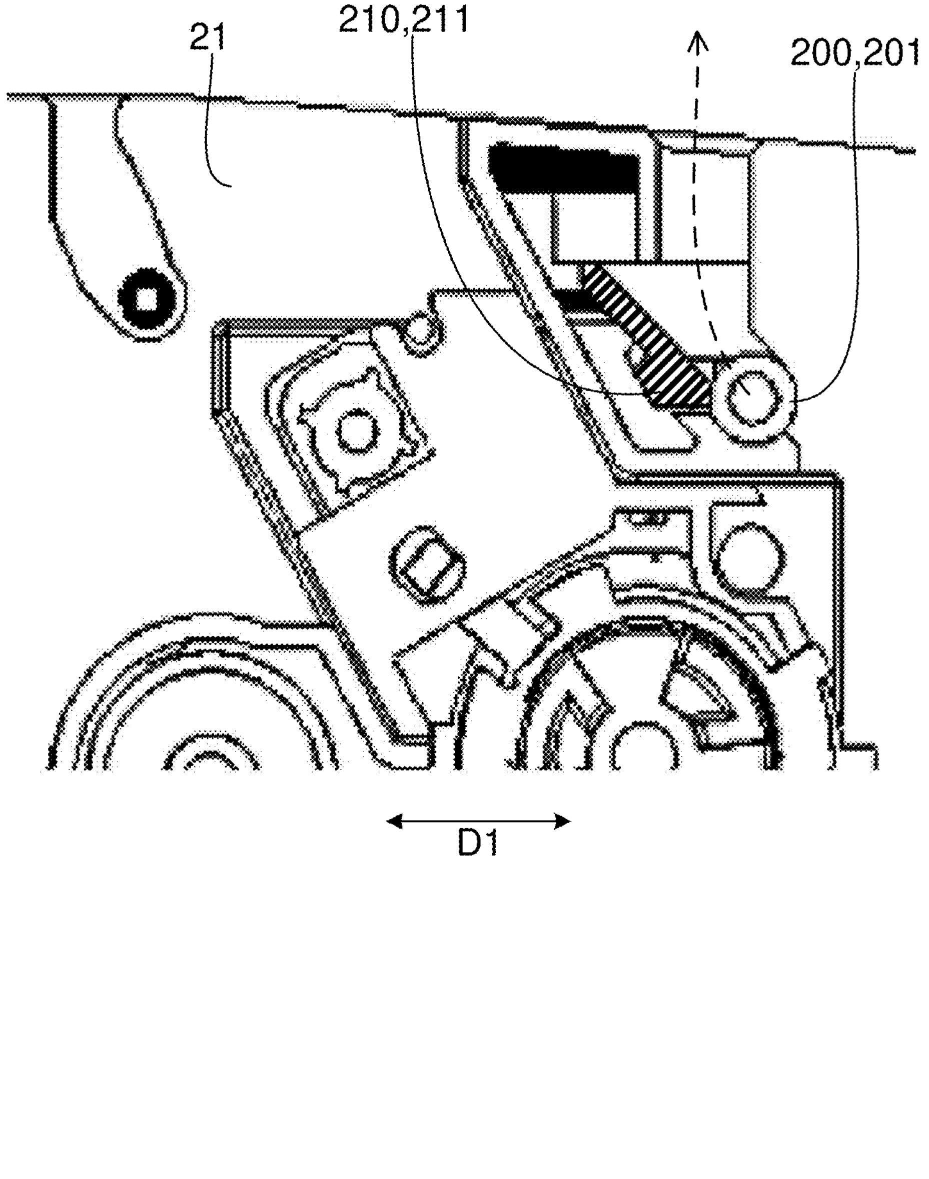
FIG. 9 is a diagram illustrating an engagement structure between a development cartridge and the link member of the image forming apparatus according to the embodiment.

Here, referring to FIG. 9, a description will be given of an engagement structure between one of the development cartridges 200 (the cartridge engagement portions 201) and one of the link engagement portions 211 assigned thereto. Engagement structures of the development cartridges 200 for the four different colors are mutually identical, and thus descriptions of the engagement structures of the other development cartridges 200 will be omitted, as the following description also applies to them. Note that, in the drawing referred to in the following description, the link engagement portion 211 is illustrated with hatching.

With the development cartridge 200 mounted in the unit frame 21, each cartridge engagement portion 201 and the link engagement portion 211 corresponding thereto engage with each other in the first direction D1. At this time, the link engagement portion 211 is positioned on the one side in the first direction D1 with respect to the cartridge engagement portion 201. In other words, the cartridge engagement portion 201 is positioned on the other side in the first direction D1 with respect to the link engagement portion 211.

To detach the development cartridge 200 from the unit frame 21, the development cartridge 200 is pulled up with respect to the unit frame 21. At this time, the cartridge engagement portion 201 moves upward. Thereby, the engagement between the cartridge engagement portion 201 and the link engagement portion 211 in the first direction D1 is released. In FIG. 9, a movement path along which the cartridge engagement portion 201 moves when the development cartridge 200 is pulled up with respect to the unit frame 21 is indicated by a dashed-line arrow.

Referring back to FIGS. 7 and 8, the link member 210 has an end part thereof on the other side in the first direction D1 as a link abutment portion 212. The link abutment portion 212 is positioned at the end part of the unit frame 21 on the other side in the first direction D1. The link abutment portion 212 abuts against part of the lock member 230 in the up-down direction. Note that the link abutment portion 212 is the end part of the link member 210 on the other side in the first direction D1.

The first biasing member 220 is, as illustrated in FIG. 7, fitted in the unit frame 21. The first biasing member 220 is a compression coil spring, for example. An axis direction of the first biasing member 220 is the first direction D1. The first biasing member 220 biases the link member 210 toward the other side in the first direction D1. Specifically, the unit frame 21 has a support portion **21*a* that supports an end part of the first biasing member 220 on the one side in the first direction D1. The link member 210 has a support portion 210*a* that supports an end part of the first biasing member 220** on the other side in the first direction D.

Figure 10:
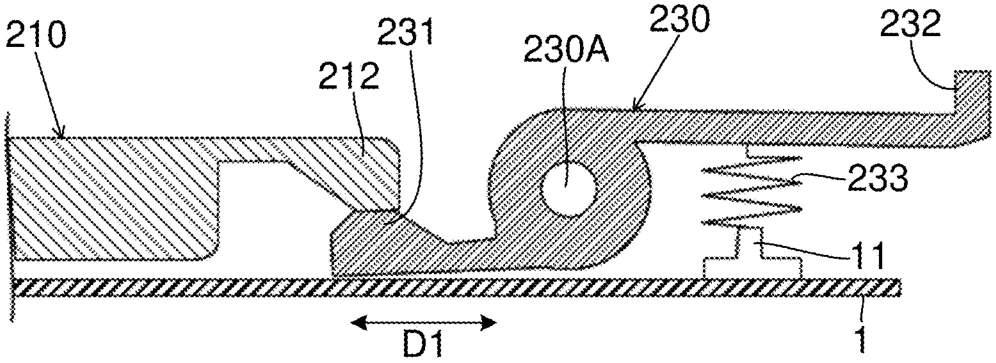
FIG. 10 is an enlarged view of and around a lock member of the image forming apparatus according to the embodiment.

The lock member 230 is, as illustrated in FIGS. 7 and 10, disposed at the end part of the unit frame 21 on the other side in the first direction D1. The lock member 230 has a rotation shaft 230A extending in the second direction D2. Further, the lock member 230 has a first portion 231 and a second portion 232. The first portion 231 is disposed on the one side in the first direction D1 with respect to the rotation shaft 230A, and is rotatable about the rotation shaft 230A as a pivot. The second portion 232 is disposed on the other side in the first direction D1 with respect to the rotation shaft 230A, and is rotatable about the rotation shaft 230A as a pivot. With this structure, when the first portion 231 shifts upward (that is, toward one side in the up-down direction), the second portion 232 shifts downward (that is, toward the other side, which is opposite to the one side in the up-down direction).

The first portion 231 abuts against the link abutment portion 212 in the up-down direction. The link abutment portion 212 abuts against the first portion 231 from above (that is, from the one side in the up-down direction). In other words, the first portion 231 abuts against the link abutment portion 212 from below (that is, from the other side which is opposite the one side in the up-down direction).

The second portion 232 is engageable with the main body frame 1 in the first direction D1. The main body frame 1 has a main body engagement portion 10 (see FIG. 13), of which detailed description will be given later. The second portion 232 is engageable with the main body engagement portion 10 in the first direction D1. With the main body engagement portion 10 and the second portion 232 in engagement with each other, the main body engagement portion 10 is positioned on the one side in the first direction D1 with respect to the second portion 232. In other words, with the main body engagement portion 10 and the second portion 232 in engagement with each other, the second portion 232 is positioned on the other side in the first direction D1 with respect to the main body engagement portion 10.

Further, the lock member 230 has a second biasing member 233. The second biasing member 233 is, for example, a tension coil spring. The main body frame 1 has a spring support portion 11 that supports the second biasing member 233. The spring support portion 11 is disposed at a position facing, and spaced from, the second portion 232 in the up-down direction. The spring support portion 11 is disposed below the second portion 232. The second biasing member 233 is disposed between the second portion 232 and the spring support portion 11 in the up-down direction. Of the second biasing member 233, an upper end part is fitted to the second portion 232, and a lower end part is fitted to the spring support portion 11. The second biasing member 233 pulls the second portion 232 downward.

<Restraining Detachment of Process Unit>

Figure 11:
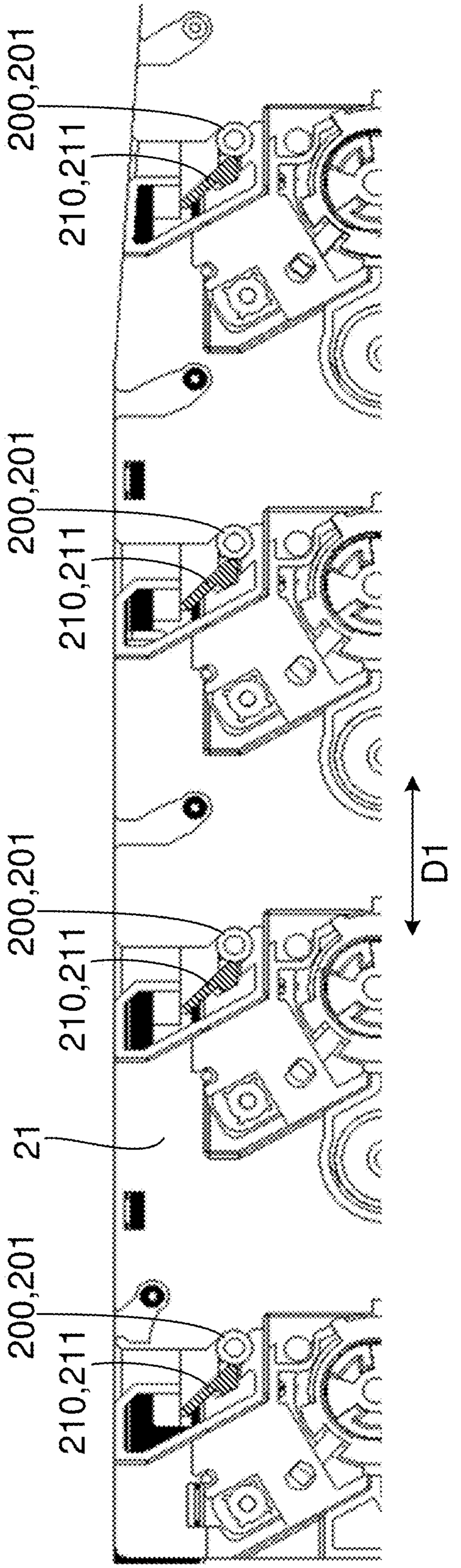
FIG. 11 is a diagram illustrating a state where all development cartridges are in engagement with a link member of the image forming apparatus according to the embodiment.
Figure 12:
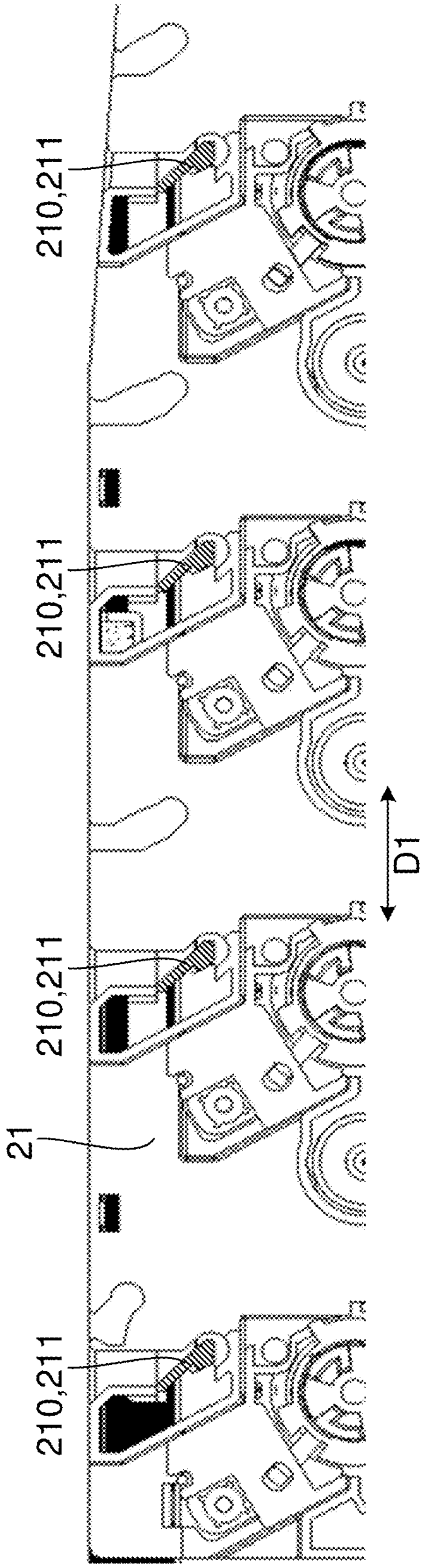
FIG. 12 is a diagram illustrating a state where engagement of all the development cartridges with the link member of the image forming apparatus according to the embodiment is released.

With the development cartridges 200 for the four different colors mounted in the unit frame 21, as illustrated in FIG. 11, the development cartridges 200 (the cartridge engagement portions 201) for the four different colors are in engagement with the link member 210 (the link engagement portions 211) in the first direction D1, thereby restraining movement of the link member 210 toward the other side in the first direction D1. That is, the link member 210, though biased by a biasing force of the first biasing member 220 toward the other side in the first direction D1, does not move toward the other side in the first direction D1. Note that, when all the development cartridges 200 are detached with respect to the unit frame 21, by the biasing force of the first biasing member 220, as illustrated in FIG. 12, the link member 210 is caused to move toward the other side in the first direction D1. A detailed description will be given later.

Here, the lock member 230 is a member that is caused to shift its position by the link member 210 moving in the first direction D1. That is, unless the link member 210 moves toward the other side in the first direction D1, the lock member 230 remains at a constant position.

Specifically, with the development cartridges 200 for the four different colors mounted in the unit frame 21, the lock member 230 is held at a first position at which the lock member 230 can engage with the main body engagement portion 10 in the first direction D1. The position at which the lock member 230 is located in FIG. 10 is the first position. At this time, the first portion 231 of the lock member 230 abuts against the link abutment portion 212 in the up-down direction. Thereby, upward movement of the first portion 231 is restrained, and thus the lock member 230 does not shift from the first position.

In the state illustrated in FIG. 10, the unit frame 21 is pulled out toward the one side in the first direction D1. As a result, as illustrated in an upper diagram of FIG. 13, the second portion 232 of the lock member 230 and the main body engagement portion 10 come into engagement with each other in the first direction D1. In this state, the unit frame 21 cannot be pulled out any further toward the one side in the first direction D1. In other words, the lock member 230 restrains the movement of the unit frame 21 toward the one side in the first direction D1.

Figure 13:
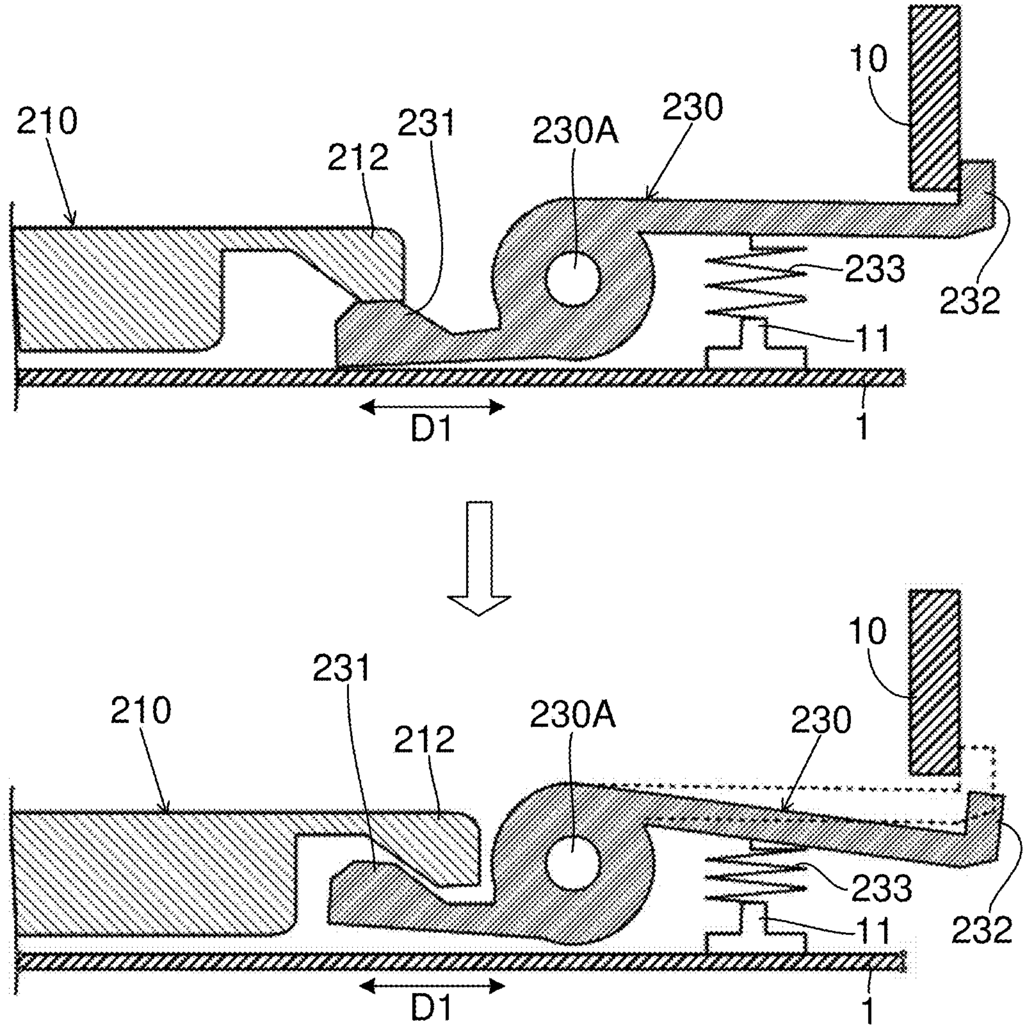
FIG. 13 is a diagram illustrating position shift of the lock member of the image forming apparatus according to the embodiment.

When the unit frame 21 is pulled out into the state illustrated in the upper diagram of FIG. 13, all the development cartridges 200 are exposed upward (see FIG. 5). Thereby, it becomes possible to detach all the development cartridges 200 from the unit frame 21.

Here, assume that, from the state illustrated in the upper diagram of FIG. 13, for example, one to three of the development cartridges 200 have been detached from the unit frame 21. In this state, however, the remaining one or ones of the development cartridges 200 is/are still in engagement with the link member 210 in the first direction D1, and thus the link member 210 does not move toward the other side in the first direction D1, and the lock member 230 is held at the first position. That is, the second portion 232 of the lock member 230 and the main body engagement portion 10 are held in engagement with each other in the first direction D1.

On the other hand, assume that all the development cartridges 200 have been detached from the unit frame 21. In this case, as illustrated in FIG. 12, the link member 210, by having its engagement with all the development cartridges 200 released, is caused to move toward the other side in the first direction D1 with the biasing force of the first biasing member 220.

By the link member 210 moving toward the other side in the first direction D1, the lock member 230 is caused to shift from the first position to the second position. Specifically, by the link member 210 moving toward the other side in the first direction D1, as illustrated in a lower diagram of FIG. 13, the link abutment portion 212 is caused to move to a position at which it does not contact the first portion 231 in the up-down direction. At this time, the first portion 231 moves upward, and the second portion 232 moves downward. Thereby, the engagement between the main body engagement portion 10 and the second portion 232 in the first direction D1 is released. As a result, it becomes possible to detach the unit frame 21 from the main body frame 1.

In the present embodiment, if at least one of the development cartridges 200 remains in the unit frame 21 without being detached therefrom, the unit frame 21 is restrained from being detached from the main body frame 1. That is, with at least one of the development cartridges 200 mounted in the unit frame 21, the process unit 2 cannot be detached from the apparatus main body (that is, the main body frame 1) of the image forming apparatus 100. By all the development cartridges 200 being detached from the unit frame 21, the process unit 2 is allowed to be detached from the apparatus main body.

With all the development cartridges 200 detached from the unit frame 21, the process unit 2 has a comparatively reduced weight. When the process unit 2 is light in weight, it is easy to carry the process unit 2. This helps prevent an operator in charge of detaching the process unit 2 from accidentally dropping the process unit 2. That is, the process unit 2 can be detached safely.

Further, in the present embodiment, by using the lock mechanism 20, a structure can be easily obtained in which only when all the development cartridges 200 have been detached from the unit frame 21, the process unit 2 can be detached from the apparatus main body.

It should be understood that the embodiments disclosed herein are examples in all aspects and do not limit the implementation of the present invention in any way. The range of the present disclosure is shown not by the above descriptions of embodiments but the scope of claims for patent, and it is intended that all modifications within the meaning and range equivalent to the scope of claims for patent are included.

What is claimed is:

1. An image forming apparatus, comprising a main body frame; and a process unit that executes a development process of developing an electrostatic latent image into a toner image, wherein the process unit includes a unit frame that is mounted so as to be attachable and detachable with respect to the main body frame, and that is detachable by being pulled out from the main body frame toward one side in a first direction, a plurality of development cartridges that are mounted so as to be mutually independently attachable and detachable with respect to the unit frame, and that each contain toner for the development process, and a lock mechanism that restrains detachment of the unit frame from the main body frame, the lock mechanism has a lock member that, by being held at a first position at which the lock member is engageable with the main body frame, restrains movement of the unit frame toward the one side in the first direction, and a link member reciprocatable in the first direction with respect to the unit frame, and the lock member is a member that is caused to shift a position thereof by the link member moving in the first direction, and is caused, by all the development cartridges being detached from the unit frame, to shift from the first position to a second position at which the lock member does not engage with the main body frame.

2. The image forming apparatus according to claim 1, wherein the lock mechanism further has a first biasing member that biases the link member toward an other side in the first direction, the plurality of development cartridges are, in a state of being mounted in the unit frame, each in engagement with the link member, thereby restraining movement of the link member toward the other side in the first direction, the link member is caused, by all the development cartridges being detached from the unit frame, to move toward the other side in the first direction with a biasing force of the first biasing member, and the lock member is caused, by the link member moving toward the other side in the first direction, to shift from the first position to the second position.

3. The image forming apparatus according to claim 2, wherein the link member has a link abutment portion, the lock member has a rotation shaft extending in a second direction orthogonal to the first direction, a first portion that is disposed on the one side in the first direction with respect to the rotation shaft, that is rotatable about the rotation shaft as a pivot, and against which the link abutment portion abuts from above, a second portion that is disposed on the other side in the first direction with respect to the rotation shaft, that is rotatable about the rotation shaft as a pivot, and that is, with the link abutment portion abutting against the first portion, held at a position at which the second portion is engageable with the main body frame, and a second biasing member that biases the second portion downward, and when the link member moves toward the other side in the first direction, by abutment of the link abutment portion against the first portion being released, the second portion is caused to be moved downward with a biasing force of the second biasing member, such that a state is achieved in which the lock member has shifted from the first position to the second position.

* * * * *